United States Patent
Lee et al.

(10) Patent No.: US 7,260,072 B2
(45) Date of Patent: Aug. 21, 2007

(54) DATA PUSH SERVICE SYSTEM AND METHOD USING A HETEROGENEOUS NETWORK

(75) Inventors: Sang-Do Lee, Suwon-si (KR); Jin-Man Kim, Yongin-si (KR); Tae-won Kim, Yongin-si (KR); Young-Ki Jeon, Hwaseong-gun (KR); Jin-Soo Lee, Suwon-si (KR); Soo-Hoi Kim, Yongin-si (KR); Jin-Seok Ko, Yongin-si (KR); Hong-Sung Chang, Suwon-si (KR); Sang-Jun Moon, Yongin-si (KR); Je-Hyun Jung, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 512 days.

(21) Appl. No.: 10/943,959

(22) Filed: Sep. 20, 2004

(65) Prior Publication Data

US 2005/0063329 A1    Mar. 24, 2005

(30) Foreign Application Priority Data

Sep. 19, 2003   (KR) ................ 10-2003-0065053

(51) Int. Cl.
*H04Q 7/24*   (2006.01)
(52) U.S. Cl. ............... 370/328; 370/352; 455/552.1
(58) Field of Classification Search ............... None
See application file for complete search history.

(56) References Cited

U.S. PATENT DOCUMENTS 6,161,008 A   12/2000   Lee et al. ............... 455/414
2002/0150053 A1   10/2002   Gray, III et al. ........... 370/252
2004/0120283 A1*   6/2004   Rezaiifar et al. ........... 370/328

FOREIGN PATENT DOCUMENTS

| JP | 10-327258 | 12/1998 |
| JP | 2000-068889 | 3/2000 |
| JP | 2002-261982 | 9/2002 |
| JP | 2003-259453 | 9/2003 |
| WO | WO 01/93607 | 12/2001 |

\* cited by examiner

*Primary Examiner*—Erika A. Gary
(74) *Attorney, Agent, or Firm*—Roylance, Abrams, Berdo & Goodman, L.L.P.

(57) ABSTRACT

A data push service system and method using a heterogeneous network. The system transmits push data to a Hybrid Access Terminal (HAT) in a heterogeneous mobile communication system in which at least one circuit network overlaps with at least one packet network. The HAT can be connected to a circuit network or a packet network, and is registered in a new access network. The system includes a Packet Service & Mobility Gateway (PSMG) for acquiring access state and connection information of the HAT from the circuit network and the packet network, and generating an access network switching request upon receipt of an external request signal; and a Push Proxy Gateway (PPG) for acquiring access information of the HAT which will transmit the push data from the PSMG, and transmitting a request message to the PSMG.

12 Claims, 7 Drawing Sheets

DATA PUSH SERVICE SYSTEM AND METHOD USING A HETEROGENEOUS NETWORK

PRIORITY

This application claims the benefit under 35 U.S.C. 119(a) of an application entitled "DATA PUSH SERVICE SYSTEM AND METHOD USING HETEROGENEOUS NETWORK", filed in the Korean Intellectual Property Office on Sep. 19, 2003 and assigned Serial No. 2003-65053, the entire contents of which are herein incorporated by reference.

BACKGROUND OF THE INVENTION

1. Field of the Invention

The present invention relates to a data push service system and method for use in a mobile communication system. More particularly, the present invention relates to a data push service system and method using a heterogeneous network.

2. Description of the Related Art

Data push service has been widely used as a data service format provided to a user who gains access to the Internet. The data push service can provide the user with a variety of functions, such as a Short Message Service (SMS) of a mobile communication network, over an IP network. The data push service can be transferred from a server to the user without receiving a user's request, and can provide the user with not only text data, but also multimedia data such as video and audio data.

The data push service over a mobile communication network will hereinafter be described with reference to FIG. 1.

Referring to FIG. 1, if a Push Initiator (PI) 100 generates data to be transmitted to a user, it transmits a push request to a Push Proxy Gateway (PPG). In this case, provided that a Point-to-Point Protocol (PPP) session is positioned between an Access Terminal (AT) 130 and a Packet Data Service Node (PDSN) 120, and the PPG 110 recognizes an Internet Protocol (IP) address of the AT 130, the PPG 110 transmits push data to the AT 130 over the PDSN 120. However, if there is no PPP connection between the AT 130 and the PDSN 120, or the PPG 110 is unable to recognize the IP address of the AT 130, push data is unable to be transmitted over the IP network, such that the PPG 110 transmits a request signal to a Short Message Service Center (SMSC) 140 to convert the push data into an SMS message, and transmits the SMS message to the AT 130 over a Mobile Switching Center (MSC) 150.

However, provided that the aforementioned data push service method for use in the mobile communication system is unable to convert the push data into the SMS message, or requires an IP connection between the PI or PPG and the AP in the same manner as in a multimedia service, it is impossible for the data push service method to provide a user with a reliable data push service.

With the increasing development of communication technologies and the increasing demands of users, a variety of radio access technologies and terminals capable of providing the users with data services have recently been proposed. A representative example is a heterogeneous network environment indicative of a mobile communication environment in which a variety of access networks using different radio access technologies are combined with each other. If a specific AT can select and access an optimum access network according to a user's selection or service categories and wireless environment variation in the heterogeneous network environment, the specific AT is called a Hybrid Access Terminal (HAT).

Although the aforementioned data push service method is applied to the heterogeneous network environment, the AT can gain access to a variety of access networks in the heterogeneous network environment. Therefore, in order to allow the PPG to correctly manage an AT's connection state, the AT must acquire a connection state from all of the accessible access networks.

SUMMARY OF THE INVENTION

Therefore, the present invention has been made in view of the above problems, and it is an object of the present invention to provide a system and method for controlling an Access Terminal (AT) to transmit push data over an optimum access network in a heterogeneous network environment.

It is another object of the present invention to provide a system and method for minimizing the number of correction items required for conventional network components during a push data transmission time.

In accordance with one aspect of the present invention, the above and other objects can be accomplished by the provision of a system for transmitting push data to a Hybrid Access Terminal (HAT) which can be connected to a circuit network or a packet network, and is registered in a new access network determined by an access network switching operation in a heterogeneous mobile communication system in which at least one circuit network is overlapped with at least one packet network. The system comprises a Packet Service & Mobility Gateway (PSMG) for acquiring access state and connection information of the HAT from the circuit network and the packet network, and generating an access network switching request of the HAT upon receipt of an external request signal; and a Push Proxy Gateway (PPG) for acquiring access information of the HAT which will transmit the push data from the PSMG, and transmitting a request message to the PSMG such that the HAT can access a network selected by the push data.

In accordance with another aspect of the present invention, there is provided a method for transmitting push data to a Hybrid Access Terminal which can be connected to a circuit network or a packet network, and registers access state and connection information in a new access network determined by an access network switching operation in a heterogeneous mobile communication system in which at least one circuit network is overlapped with at least one packet network. The method comprises requesting, by a Push Proxy Gateway (PPG), access state and connection information of the HAT to which the push data is to be transmitted, from a Packet Service & Mobility Gateway (PSMG), when the push data is generated; detecting, by the PSMG, the requested access state and connection information of the HAT, and transmitting the detected information to the PPG; and generating, by the PPG, a request signal when a corresponding HAT is not connected to a selected network corresponding to push data characteristics such that the HAT is switched to the selected network over the PSMG.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Figure 1:
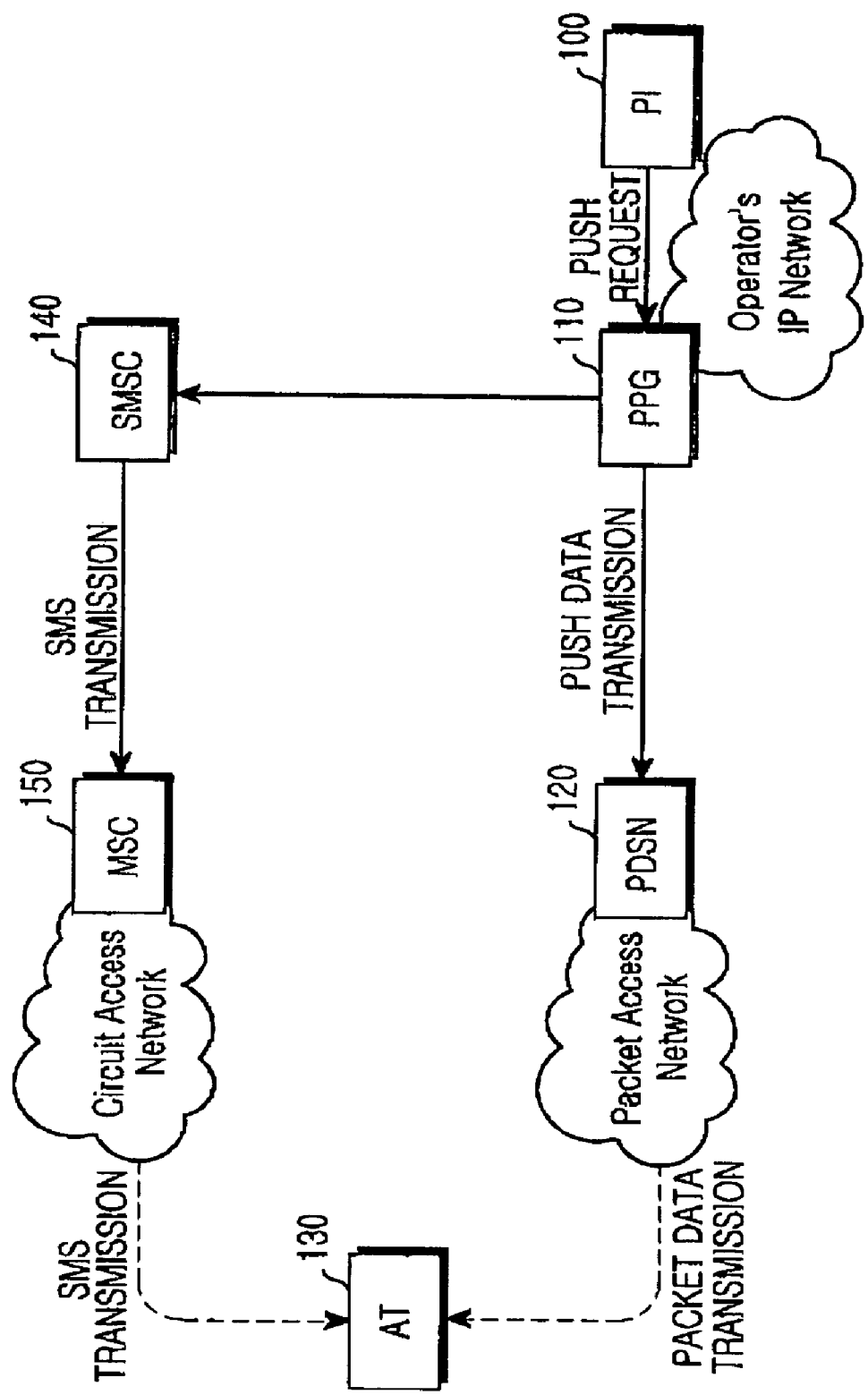
FIG. 1 is a block diagram illustrating a conventional data push service network.

Embodiments of the present invention will now be described in detail with reference to the accompanying drawings. In the drawings, the same or similar elements are denoted by the same reference numerals even though they are depicted in different drawings. In the following description, a detailed description of known functions and configurations incorporated herein will be omitted for conciseness.

The embodiments of the present invention provide a method for providing a reliable data push service over an optimum access network in a heterogeneous network environment.

Figure 2:
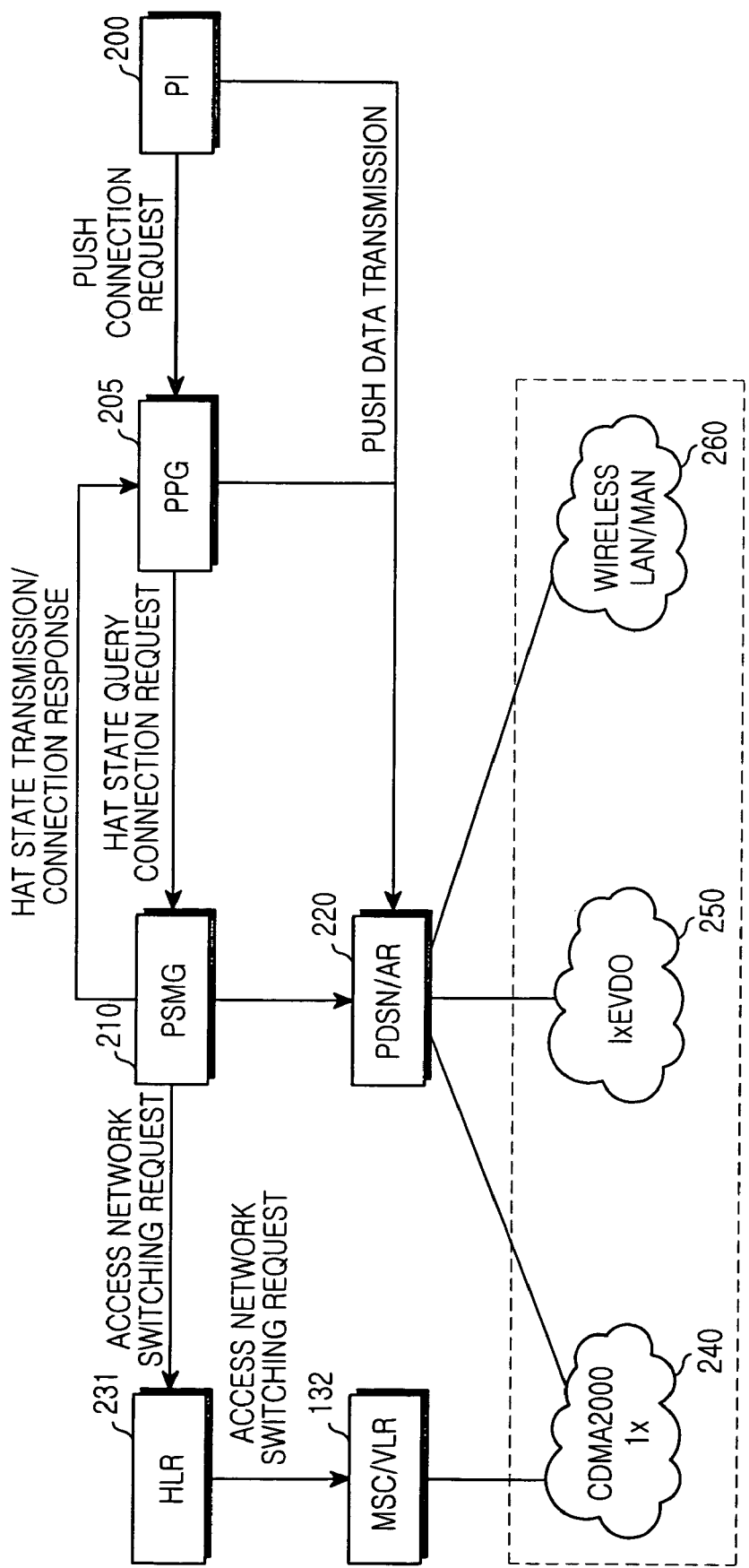
FIG. 2 is a block diagram illustrating a data push service system over a heterogeneous network in accordance with an embodiment of the present invention.

FIG. 2 is a block diagram illustrating a data push service system over a heterogeneous network in accordance with an embodiment of the present invention. Referring to FIG. 2, a Packet Data Service Node (PDSN) 220 is interoperable with individual base stations of a Code Division Multiple Access (CDMA) 1X 240 network and a 1x First Evolution Data Only (1X EVDO) 250 network, and the access router (AR) 220 is interoperable with a base station of a wireless Local Area Network/Metropolitan Area Network (LAN/MAN) network, but the PDSN 220 and the AR 220 perform the same functions, such that they are also called a PDSN/AR 220. For the convenience of description, the PDSN and the AR will be described separately according to their interoperable networks even though the same reference numeral is assigned to them.

A heterogeneous network includes a variety of conventional access networks (e.g., a CDMA 2000 1X 240, a 1xEVDO 250, and a wireless LAN/MAN 260), and a Packet Service & Mobility Gateway (PSMG) 210 for transmitting an interworking service between a circuit network and a packet network to a user who gains access to a service network over the above access networks.

If push data to be transmitted to the user occurs, the Push Initiator (PI) 200 directly transmits the push data to a Push Proxy Gateway (PPG) 205, or requests connection information for an Access Terminal (AT) from the PPG 205.

The PPG 205 transmits the push data transferred from the PI 200 to the user over a wireless access network. Specifically, if the PI 200 generates a push request, the PPG 205 queries the PSMG 210 for an AT's state to select an optimum access network, such that the push data is transmitted to the AT using connection information transmitted from the PSMG 210.

The PSMG 210 is connected to a Home Location Register (HLR) 231 using an IS-41-based protocol, and is connected to a PDSN/AR 220 using a Service Internet Protocol (SIP) server (not shown). The PSMG 210 converts a protocol between an IS-41 and the SIP into another protocol, receives location registration data from a Hybrid Access Terminal (HAT), and receives a SIP registration process from the PDSN/AR 220, such that it can manage a connection state of the HAT. In this case, the connection state of the HAT managed by the PSMG 210 comprises an "On Packet State" and an "On Circuit State". The PSMG 210 performs a SIP register function to manage locations of subscribers who gain access to the IP network over a variety of access networks, and manages interconnection relation data (e.g., MIN, IP address, and NAI information, etc.) on the basis of subscriber information received from a location register process of the HAT.

The HAT is registered in the PSMG 210 whenever it moves between different access networks, such that the PSMG 210 can manage a variety of HAT information, for example, position information, and access state and connection information of the HAT. When the PSMG receives the HAT connection information request and determines that a current access network of the HAT is different from an access network requested by the PPG 205, it transmits an access network switching request to the HAT.

The HLR 231 connected to the PSMG 210 stores a service profile associated with a user who gains access to a service network, manages locations of a HAT and a subscriber on the basis of the stored service profile, and performs state management and authentication functions of the HAT and the subscriber on the basis of the stored service profile, such that it transmits automatic roaming services to users each having mobility. Besides the aforementioned general functions, the HLR 231 stores not only information associated with a HAT hybrid operation, but also service profiles associated with a voice and incoming call signal of the user who gains access to a circuit network. In the case of processing the incoming call signal transferred from a HAT or a Packet Switched Telephone Network (PSTN) (not shown), the HLR 231 determines whether category information of a current HAT is indicative of a HAT applicable to a heterogeneous network. In this case, the category information of the MS is included and stored in subscriber information.

The PDSN/AR 220 connected to the PSMG 210 over the SIP forms a two-layer connection for the HAT using a Point to Point Protocol (PPP) connection. The PDSN/AR 220 performs IP address assignment and IP packet routing functions, a Frequency Assignment (FA) function for a mobile IP service, an interworking function with an authentication server (not shown in FIG. 2 for settlement and authentication, and a Quality of Service (QoS) support function. Besides the aforementioned general functions, the PDSN/AR 220 performs the following functions to support an interworking service between a circuit network and a packet network.

If the HAT of a user who registers in a simple IP service performs an SIP registration process, the PDSN/AR 220 transmits an SIP registration message to the PSMG 210. If the HAT of a user who registers in a mobile IP service performs an IP registration process, the PDSN/AR 220 transmits an SIP registration message to the PSMG 210. Whenever the HAT moves between various access networks while maintaining a PPP connection with the PDSN/AR 220, the PDSN/AR 220 transmits the SIP registration message to the PSMG 210.

If the PDSN/AR 220 receives an IP packet transmitted to the HAT in an "On Circuit" state, it performs IP packet buffering until connected to the HAT over a packet access network (AN). The PDSN/AR 220 receives SIP or HAT IP registration data from the HAT, and receives notification data from the HLR 231, such that it can manage connection states of the user and the HAT. In this case, if the HAT connection state managed by the PDSN/AR 220 communicates with a packet network, this state is called an "On Packet" state. Otherwise, if the HAT connection state managed by the PDSN/AR 220 communicates with a circuit network, this state is called an "On Circuit" state.

Besides the aforementioned components, a base station of the CDMA-2000 1x network 240, a base station of the 1xEVDO network 250, and internal components of the wireless LAN/MAN network including an Access Point (AP) are generally well known to those skilled in the art, so that their detailed descriptions will herein be omitted for the convenience of description. Also, a plurality of Mobile Switching Center/Visitor Location Registries (MSC/VLRs) 132 connected to the CDMA-2000 1x network are also well known to those skilled in the art, so that their detailed description will herein be omitted for the convenience of description.

Upon receiving a push request or a connection request, the PPG 205 acquires access state or connection state information associated with the HAT over an interface defined between the PSMG 210 and the PPG 205. If the PSMG 210 transmits connection information including an IP address to the PPG 205, the PPG 205 directly transmits push data to the HAT, or the PI 200 having received the connection information from the PPG 205 transmits such push data to the HAT.

Figure 3:
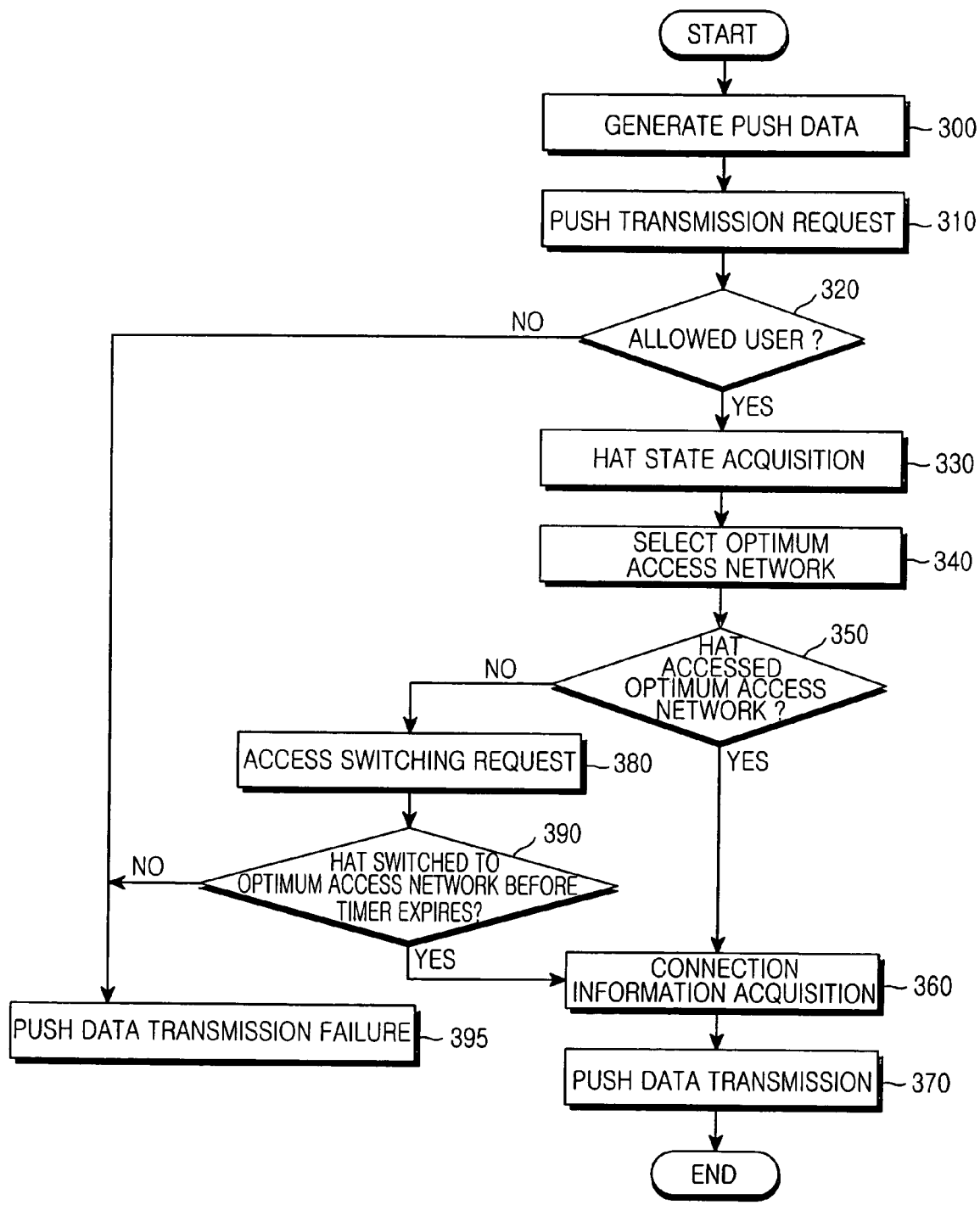
FIG. 3 is a flow chart illustrating a data push service method over a heterogeneous network in accordance with an embodiment of the present invention.

FIG. 3 is a flow chart illustrating a data push service method over a heterogeneous network in accordance with the present invention.

Referring to FIG. 3, push data to be transmitted to a subscriber is generated at step 300. The push data may be equal to push data capable of being transmitted to the HAT at one time in the same manner as an SMS message, and may require an IP connection, including a Transmission Control Protocol (TCP) or User Datagram Protocol (UDP) session and IP address, between the PI 200 and the HAT in the same manner as a multimedia message.

If the generated push data is determined to be push data capable of being transmitted to the HAT at one time in the same manner as the SMS message, the PT 200 includes the push data in a push request message, and transmits the push request message including the push data to the PPG 205 at step 370.

However, if it is determined that the generated push data requires the IP connection, the PI 200 transmits a connection request message to the PPG 205 at step 310. In the above two cases, the PI 200 includes a subscriber Uniform Resource Identifier (URI) for identifying a subscriber in the message.

The PPG 205 having received a push request or connection request message searches for subscriber information from an Authentication, Authorization and Accounting (AAA) server, and determines whether the current subscriber is allowed to use the push service at step 320. If it is determined that the subscriber is not allowed to use the push service at step 320, the PPG 205 rejects the push request. Otherwise, if it is determined that the subscriber is allowed to use the push service at step 320, the PPG 205 queries the PSMG 210 for the HAT connection state, and acquires the HAT connection state at step 330. Therefore, the PPG 205 selects an optimum access network on the basis of a subscriber profile, the received HAT connection state, and push data characteristics at step 340. A detailed algorithm for enabling the PPG 205 to select an optimum access network is not considered to be an important matter of the present invention, so that its detailed description will herein be omitted for the convenience of description.

The PPG 205 having selected the optimum access network determines whether the HAT is connected to an optimum access network at step 350. If it is determined that the HAT is connected to the optimum access network at step 350, the PPG 205 acquires connection information such as a HAT IP address from the PSMG 210 at step 360. The PI 200 or the PPG 205 directly transmits push data to the HAT using the acquired IP address at step 370.

In the meantime, if it is determined that the HAT is not connected to the optimum access network at step 350, the PPG 205 switches a current access network of the HAT to the optimum access network at step 380. The PPG 205 requests the access network switching, and at the same time drives a timer. The PPG 205 determines whether the HAT is switched to the optimum access network before the timer expires at step 390. If it is determined that the HAT is switched to the optimum access network before the timer expires at step 390, the PPG 205 goes to step 360.

If it is determined that the HAT is not switched to the optimum access network before the timer expires at step 390, the PPG 205 does not transmit push data at step 395.

A variety of embodiments of the push data transmission method for use in the heterogeneous system according to the present invention will hereinafter be described.

Figure 4:
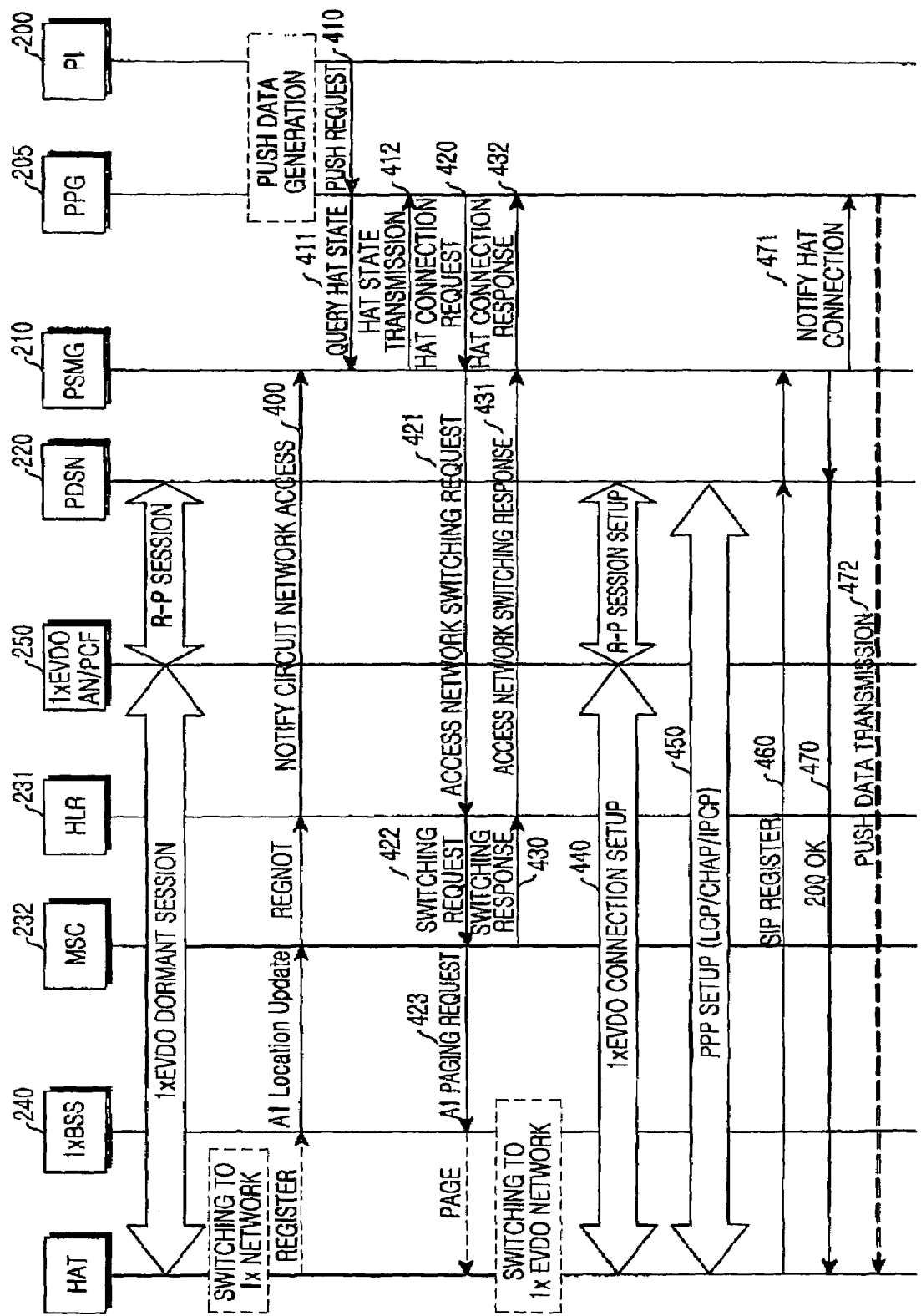
FIG. 4 is a flow chart illustrating a data push service over a heterogeneous network in accordance with an embodiment of the present invention.

Referring to FIG. 4, in the case where the HAT having accessed the 1xEVDO access network (AN) is switched from an idle state to the 1X access network due to the expiration of a timer, and monitors only a 1x interface, push data is generated, and the HAT is connected to the 1xEVDO network to receive the push data, its detailed description will hereinafter be described.

Referring to FIG. 4, the HAT transmits a register message to the 1X BSS 240 when it is switched from a 1xEVDO idle state to a 1x access network at step 400, such that it informs the PSMG 210 of specific information indicating that the HAT is connected to the circuit network over an MSC 232 and an HLR 231. If the PI 200 generates push data, it transmits a push request message including a subscriber URI to the PPG 205 at step 410.

Upon receipt of the push request message, the PPG 205 transmits an HAT state query message including a subscriber URI to the PSMG 210 in order to recognize the HAT access state at step 411. Upon receiving the HAT state query message, the PSMG 210 searches for necessary information from a DataBase (DB), and transmits a HAT state transmission message including access state, IP address, MIN number, and access network category information of the HAT corresponding to the URI to the PPG 205 at step 412. In this case, if the HAT is not connected to the circuit network or is not assigned an IP address, the IP address is not included in the HAT state transmission message. If it is determined that the HAT is connected to the CDMA-2000 1X access network when the PPG 205 having received the HAT state transmission message checks access network categories, the PPG 205 transmits a HAT connection request message including category information of the access network selected by the PPG 205 to the PSMG 210 at step 420. In this case, it is assumed that the PPG 205 has selected the 1xEVDO access network.

The PSMG 210 having received the HAT connection request message transmits a HAT switching request message including both a service option value corresponding to the access network category and a MIN number of the HAT to the HLR 231 at step 421. As an example of a service option value, a service option value of the 1xEVDO access network is determined to be '59'. Service option values corresponding to other access networks may be freely determined as needed. The HLR 231 having received the HAT switching request message searches for an ID of the MSC 232 to which the HAT is connected from a position information DB, and transmits a switching request message including a MIN number and a service option value to the MSC 232 at step 422.

The MSC 232 having received the switching request message transmits a paging request to the HAT over the 1X BSS 240 at step 423, and transmits a switching response message to the HLR 231 at step 430. The HLR 231 transmits the HAT switching response message to the PSMG 210 at step 431. The PSMG 210 indicates the beginning of the HAT switching on the HAT connection response message, and transmits the resultant message to the PPG 205 at step 432. The HAT having received a paging message in a 1x idle state checks a service option, determines that 1xEVDO network switching is required, and establishes a 1xEVDO connection at step 440. If necessary, the HAT is assigned a new IP address by establishing a PPP connection with the PDSN 220 at step 450.

The HAT switched to the 1xEVDO network transmits a SIP register message including the IP address and access network category data of the HAT to the PSMG 210 at step 460. The PSMG 210 having received the SIP register message stores an IP address and access network category information of a subscriber in a DB, transmits a '200 OK' response message to the HAT at step 470, and transmits a HAT connection response message including the IP address and access network category of the HAT to the PPG 205 at step 471. The PPG 205 having received the HAT connection response message transmits push data to the HAT using the HAT IP address at step 472. The aforementioned HAT operations associated with the PPG 205, the PSMG 210, and the HLR 231 are applicable to a case in which a 1x packet data session is maintained, or the other case in which the HAT receives a paging message in the 1x idle state after accessing a wireless LAN or a wireless MAN, is connected to the 1xEVDO access network, and transmits push data to the 1xEVDO access network.

Figure 5:
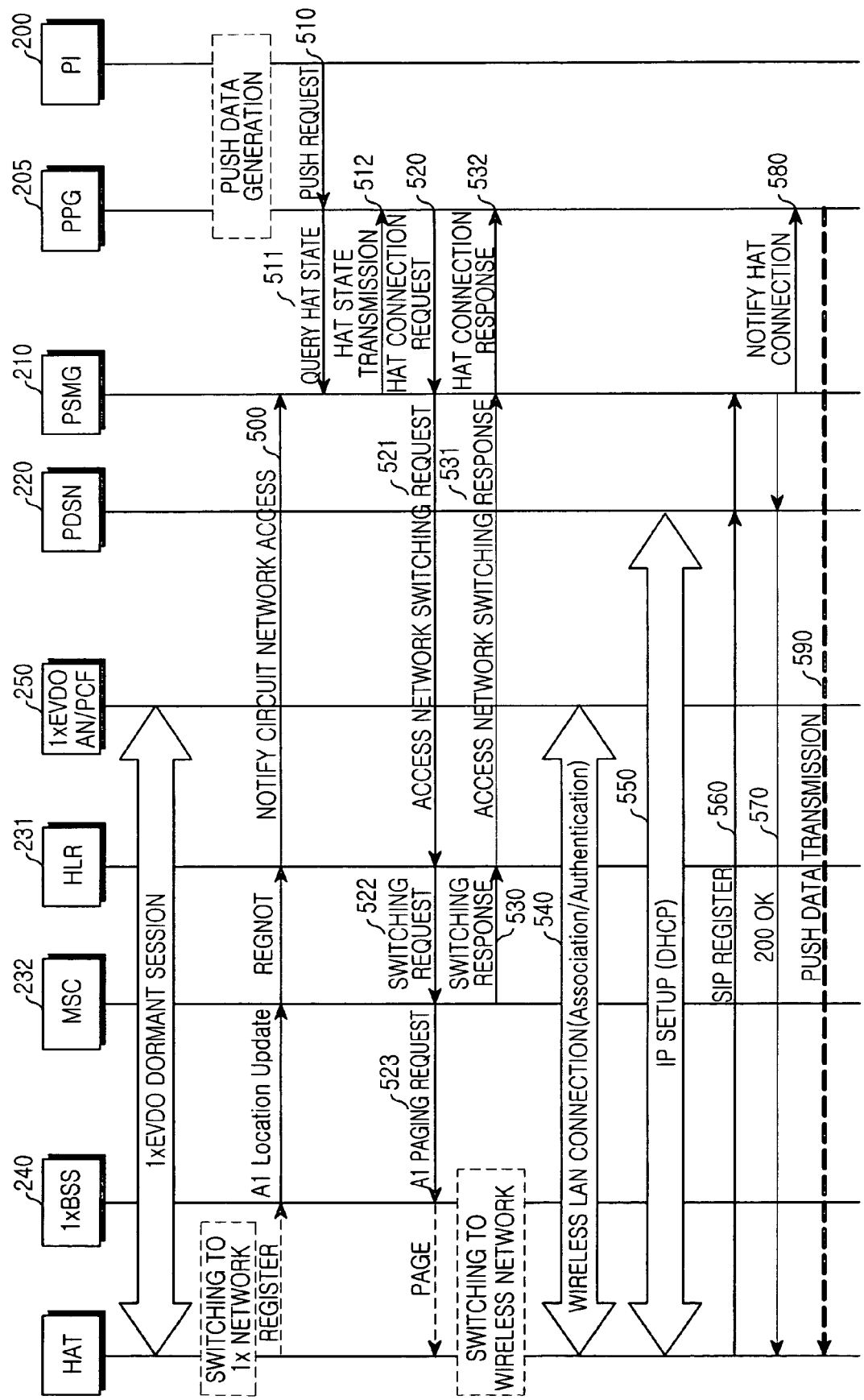
FIG. 5 is a flow chart illustrating a data push service over a heterogeneous network in accordance with another embodiment of the present invention.

Referring to FIG. 5, in the case where the HAT having accessed the 1xEVDO access network is switched to the 1x access network, and monitors only the 1X interface, push data is generated, and the HAT is connected to the wireless LAN to receive the push data, its detailed description will hereinafter be described.

Referring to FIG. 5, steps 500-532 generated until a switching request for the 1xEVDO network is transmitted to the HAT after push data has been generated from the PI 200 are equal to the above steps 400-432 of the aforementioned first embodiment, so that their detailed descriptions will hereinafter be omitted. The HAT having received a paging message in a 1x idle state checks service option information, determines that the 1xEVDO network switching is required, and attempts to access the 1xEVDO network at step 540. In this case, it is determined that the HAT exits a predetermined 1xEVDO area, such that the HAT is connected to the wireless LAN instead of the 1xEVDO network at step 540, and is assigned a new IP address using an IP setup process (e.g., Dynamic Host Configuration Protocol (DHCP)) between the HAT and the AR (Access Router). If the HAT is switched to the wireless LAN, it transmits a SIP register message including new IP address and access network category data to the PSMG 210 at step 560. The PSMG 210 having received the SIP register message stores the new IP address and access network category data of a subscriber in the DB at step 570, and transmits a '200 OK' response message to the HAT at step 570. The PSMG 210 transmits an HAT connection response message including the new IP address and access network category data of the HAT to the PPG 205 at step 580. The PPG 205 having received the HAT connection response message transmits push data to the HAT using the HAT IP address at step 590. In this case, the aforementioned HAT operations associated with the PPG 205, the PSMG 210, and the HLR 231 are applicable to a case in which the 1x packet data session is maintained, or the other case in which the HAT having received a paging message in the 1x idle state is connected to the wireless LAN or wireless MAN, and receives push data.

Figure 6:
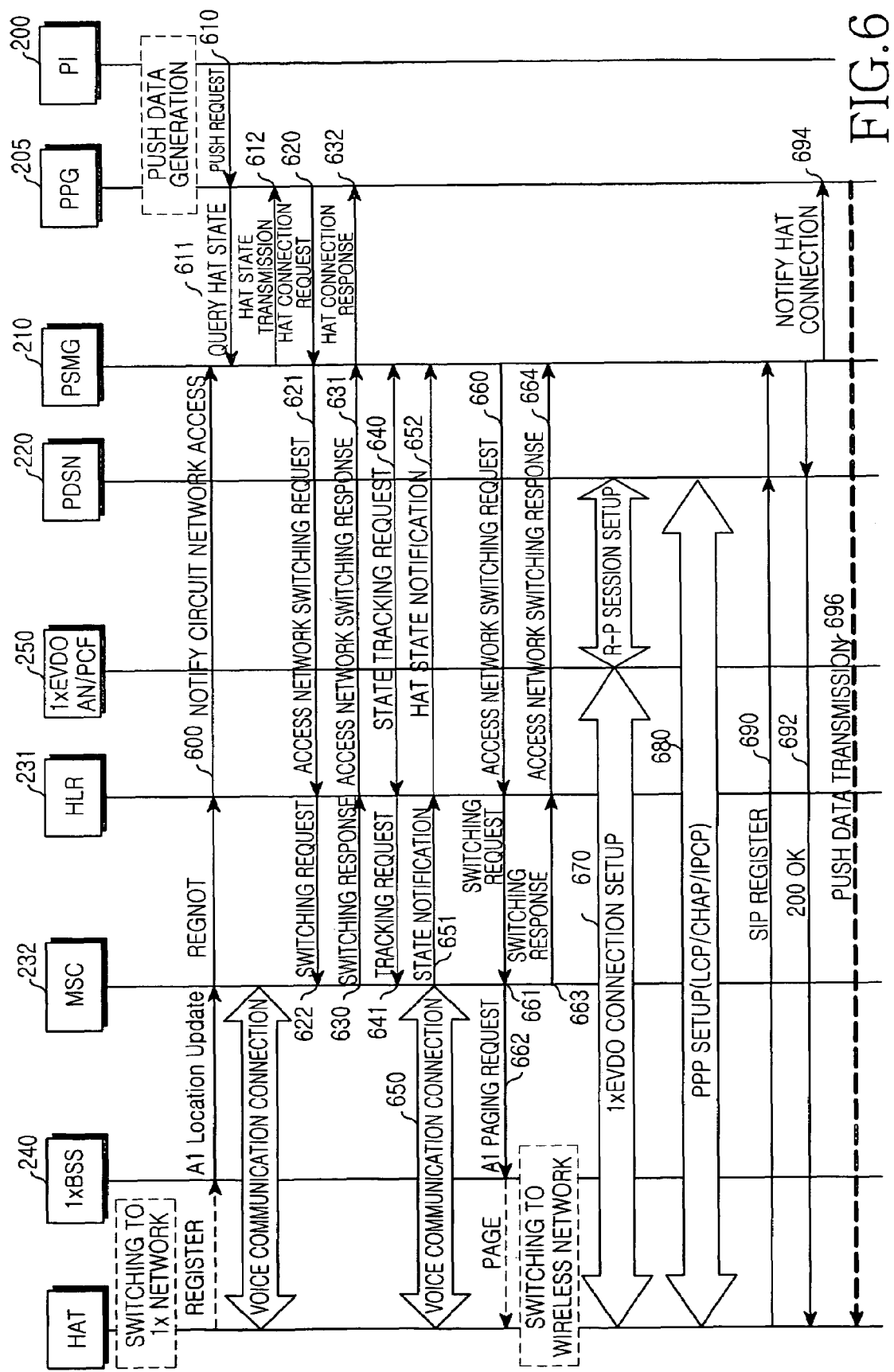
FIG. 6 is a flow chart illustrating a data push service over a heterogeneous network in accordance with yet another embodiment of the present invention.

Referring to FIG. 6, in the case where the HAT having accessed the 1xEVDO access network is switched to the 1x access network due to an incoming signal of a voice call so as to establish a voice communication mode, push data is generated, and its detailed description will hereinafter be described.

Referring to FIG. 6, the HAT transmits a register message to the 1x BSS 240 when it is switched from a 1xEVDO idle state to a 1x access network at step 600, such that it informs the PSMG 210 of specific information indicating that the HAT is connected to the circuit network over an MSC 232 and an HLR 231. If the PI 200 generates push data, it transmits a push request message including a subscriber URI to the PPG 205 at step 610. Upon receipt of the push request message, the PPG 205 transmits a HAT state query message including a subscriber URI to the PSMG 210 in order to recognize the HAT access state at step 611. Upon receiving the HAT state query message, the PSMG 210 searches for necessary information from a DataBase, and transmits a HAT state transmission message including access state, IP address, MIN number, and access network category information of the HAT corresponding to the URI to the PPG 205 at step 612. In this case, if the HAT is not connected to the circuit network or is not assigned an IP address, the IP address is not included in the HAT state transmission message. Because the HAT is connected to the CDMA-2000 1X access network, the PPG 205 having received the HAT state transmission message transmits a HAT connection request message including category information of the access network selected by the PPG 205 to the PSMG 210 at step 620. In this case, it is assumed that the PPG 205 has selected the 1xEVDO access network.

The PSMG 210 having received the HAT connection request message transmits a HAT switching request message including both a service option value corresponding to the access network category and a MIN number of the HAT to the HLR 231 at step 621. The HLR 231 having received the HAT switching request message searches for an ID of the MSC 232 to which the HAT is connected from a position information DB, and transmits a switching request message including a MIN number and a service option value to the MSC 232 at step 622. The MSC 232 having received the switching request message determines a voice communication mode of the HAT, displays the voice communication mode on the switching response message, and transmits the resultant message to the HLR 231 at step 630. The HLR 231 transmits the HAT switching response message to the PSMG 210 at step 631.

The PSMG 210 indicates the voice communication mode of the HAT on the HAT connection response message, and transmits the resultant message to the PPG 205 at step 632. The PSMG 210 transmits a state tracking request message to the HLR 231 at step 640. The HLR 231 having received the state tracking request message transmits a tracking request message to the MSC 232 at step 641. Therefore, if the voice communication mode of the HAT is changed to another mode, the MSC 232 must inform the HLR 231 of the changed mode. If the MSC 232 determines that the voice communication mode of the HAT is finished at step 650, it transmits a state notification message indicative of the finished voice communication mode to the HLR 231 at step 651. The HLR 231 having received the state notification message transmits a HAT state notification message to the PSMG 210 at step 652, such that it can notify that the voice communication mode has been finished. If the PSMG 210 receives the HAT state notification message, and determines the finished voice communication mode, it reattempts to perform the HAT switching process. Steps 660, 661, 662, 663 and 664 are respectively equivalent to steps 421, 422, 423, 430, and 431 of FIG. 4. Steps from 670-696 in which the HAT is switched to 1xEVDO network and receives push data are equal to steps 440-472 of the aforementioned first embodiment. In this case, the aforementioned HAT operations associated with the PPG 205, the PSMG 210, and the HLR 231 are applicable to a case in which push data transmitted to the HAT of the voice communication mode is transmitted over the wireless LAN or wireless MAN and the 1X packet access network after the voice communication mode is finished.

Figure 7:
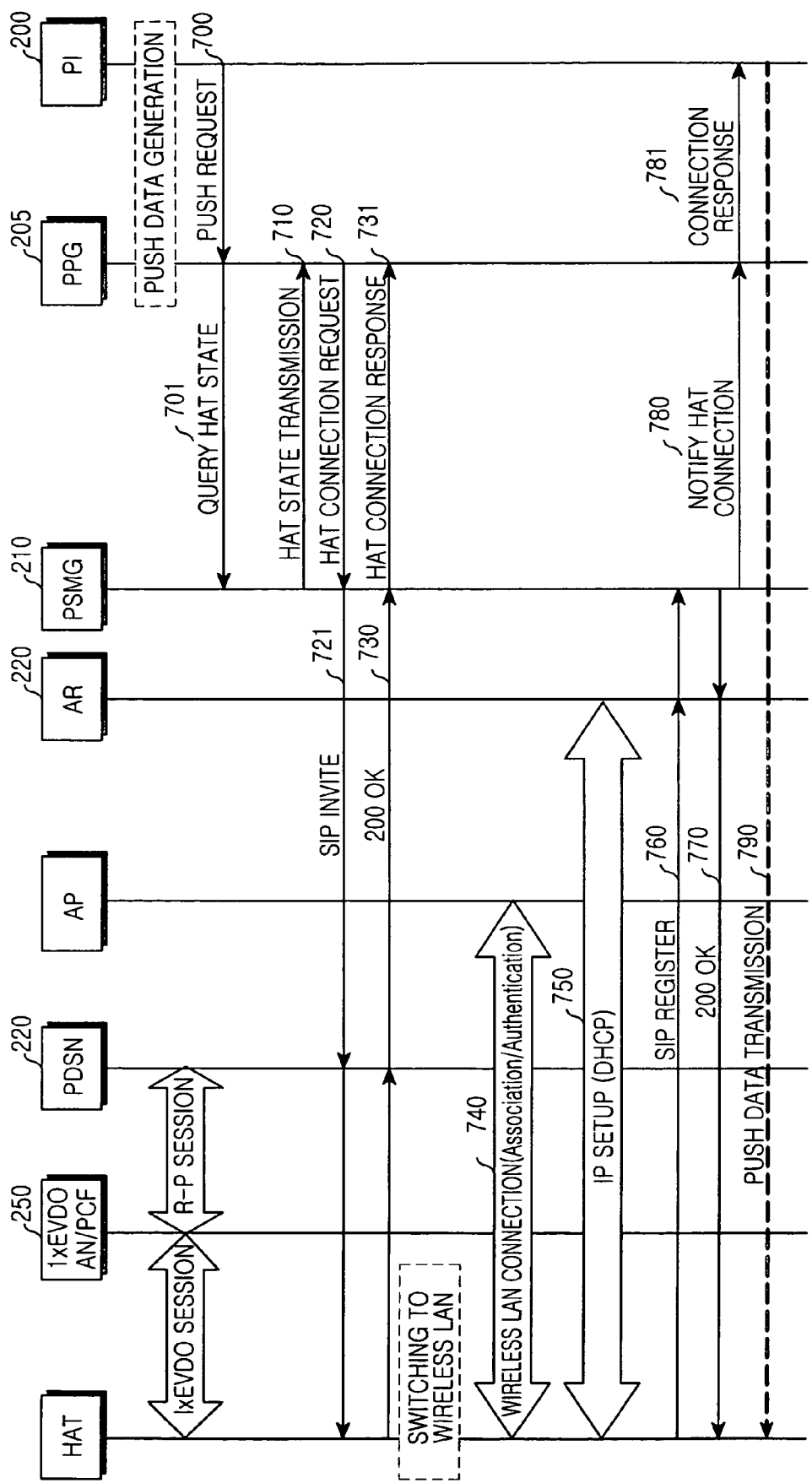
FIG. 7 is a flow chart illustrating a data push service over a heterogeneous network in accordance with still another embodiment of the present invention.

Referring to FIG. 7, if push data is generated when the HAT is connected to the 1xEVDO access network, and the HAT receives the push data over the wireless LAN, its detailed description will hereinafter be described.

If the PI 200 generates push data to be transmitted to a subscriber, and a TCP or UDP session connection is required between the PI 200 and the HAT, the PI 200 transmits a connection request message including a subscriber URI to the PPG 205 at step 700. The PPG 205 having received the connection request message transmits an HAT state query message including a subscriber URI to the PSMG 210 so as to recognize the HAT access state at step 701. Upon receiving the HAT state query message, the PSMG 210 searches for necessary information from a DataBase, and transmits a HAT state transmission message including access state, IP address, MIN number, and access network category information of the HAT corresponding to the URI to the PPG 205 at step 710. If the PPG 205 having received the HAT state transmission message selects a desired access network, it selects the wireless LAN, and transmits the HAT connection request message including access network category information to the PSMG 210 at step 720, such that the HAT is switched to the wireless LAN. The PSMG 210 having received the HAT connection request message transmits an SIP invitation message including the access network category information selected by the PPG 205 to the HAT over the 1xEVDO network at step 721. If the HAT having received the SIP invitation message is switched to the wireless LAN at step 730, it transmits a '200 OK' response message to the PSMG 210, and attempts to perform the wireless LAN switching. Upon receiving the '200 OK' response message from the HAT, the PSMG 210 transmits the received '200 OK' response message to the PPG 205 at step 731 such that it indicates the beginning of the HAT switching operation. If the HAT is connected to the wireless LAN at step 740 and is assigned a new IP address using an IP setup process between the HAT and the AR at step 750, it transmits a SIP register message including new IP address and access network category data to the PSMG 210 at step 760. Upon receipt of the SIP register message, the PSMG 210 stores a subscriber's new position, an IP address, and access network category data in a DB, and transmits the '200 OK' response message to the HAT at step 770. The PSMG 210 transmits an HAT connection response message including new IP address and access network category data of the HAT to the PPG 205 at step 780. If the PPG 205 having received the HAT connection response message transmits a connection response message including the HAT IP address to the PI 200 at step 781, the PI 200 transmits push data to the HAT using the IP address at step 790. The aforementioned operations among the PPG 205, the PSMG 210, and the HAT can be applicable to not only a case in which the HAT connected to the 1xEVDO network is switched to the wireless LAN or MAN or the 1x packet access network, but also the other case in which the HAT connected to the wireless LAN or MAN is switched to the 1xEVDO access network or the 1x access network.

A switching request message, a switching response message, a tracking request message, and a state notification message employed between the HLR 231 and the MSC 232 may be equal to conventional messages defined by a IS-41 MAP, may correct the conventional messages, or may define a new message if needed. A circuit network access notification message, a HAT switching request message, an HAT switching response message, a state tracking request message, and other state notification messages employed between the PSMG 210 and the HLR 231 may be equal to conventional messages defined in a IS-41 MAP or a INAP, etc., may correct the conventional messages, or may define a new message if needed.

As apparent from the above description, a data push service system and method according to embodiments of the present invention interfaces cellular mobile communication technologies with wireless access technologies such as a wireless LAN/MAN, such that it can provide a data push service and a reliable data push service in a heterogeneous network environment. Also, embodiments of the present invention can transmit push data over an optimum access network in the heterogeneous network environment.

Although certain embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A system for transmitting push data to a Hybrid Access Terminal (HAT) which can be connected to a circuit network or a packet network, and is registered in a new access network determined by an access network switching operation in a heterogeneous mobile communication system in which at least one circuit network is overlapped with at least one packet network, the system comprising:

a Packet Service & Mobility Gateway (PSMG) for acquiring access state and connection information of the HAT from the circuit network and the packet network, and generating an access network switching request of the HAT upon receipt of an external request signal; and a Push Proxy Gateway (PPG) for acquiring access information of the HAT which will transmit the push data from the PSMG, and transmitting a request message to the PSMG such that the HAT can access a network selected by the push data.

2. The system according to claim 1, wherein the PPG transmits the push data to the HAT over the selected network.

3. The system according to claim 1, further comprising:
a Push Initiator (PI) for generating push data to be transmitted to a specific HAT, and controlling the PPG to transmit the generated push data to the specific HAT.

4. The system according to claim 3, wherein the PI receives selected network information corresponding to the push data from the PPG, and transmits the push data to the specific HAT over the selected network.

5. The system according to claim 1, wherein the PPG determines whether the HAT which will transmit the push data can receive a push service, and transmits the push data according to the determination result.

6. The system according to claim 1, wherein the PPG operates a timer upon receipt of the access network switching request of the HAT, and transmits the push data when receiving connection information of a corresponding HAT before the timer expires.

7. The system according to claim 1, wherein the PSMG transmits a packet network switching access request to a corresponding HAT when the selected network is equal to the packet network, the corresponding HAT is in a voice communication mode, and the voice communication mode is finished.

8. A method for transmitting push data to a Hybrid Access Terminal (HAT) which can be connected to a circuit network or a packet network, and registers access state and connection information in a new access network determined by an access network switching operation in a heterogeneous mobile communication system in which at least one circuit network is overlapped with at least one packet network, comprising the steps of:

requesting, by a Push Proxy Gateway (PPG), access state and connection information of the HAT to which the push data is to be transmitted, from a Packet Service & Mobility Gateway (PSMG), when the push data is generated;

detecting, by the PSMG, the requested access state and connection information of the HAT, and transmitting the detected information to the PPG; and generating, by the PPG, a request signal when a corresponding HAT is not connected to a selected network corresponding to push data characteristics such that the HAT is switched to the selected network over the PSMG.

9. The method according to claim 8, further comprising the steps of:

acquiring, by the PSMG, connection information of the HAT switched to the selected network, and transmitting the acquired information to the PPG; and transmitting, by the PPG, the push data to the corresponding HAT using the connection information.

10. The method according to claim 8, further comprising the step of:

determining, by the PPG, whether the HAT which will transmit the push data can receive a push service, and transmitting the push data according to the determination result.

11. The method according to claim 8, further comprising the step of:

transmitting, by the PPG, the push data, if the PPG receives the connection information of the corresponding HAT from the PSMG within a predetermined period of time upon receipt of an access network switching request signal of the HAT.

12. The method according to claim 8, further comprising the step of:

determining, by the PSMG, whether a voice communication mode of the HAT is finished if the selected network is equal to a circuit network and the corresponding HAT is in the voice communication mode, and transmitting a switching access request to the corresponding HAT.

* * * * *